United States Patent [19]

Goodman et al.

[11] 3,790,142
[45] Feb. 5, 1974

[54] GAS DIFFUSER
[75] Inventors: Brian L. Goodman, Overland Park; Robert B. Higgins, Olathe; Frank M. Denham, Overland Park, all of Kans.
[73] Assignee: Ecodyne Corporation, Chicago, Ill.
[22] Filed: May 26, 1972
[21] Appl. No.: 257,123

[52] U.S. Cl. .............................................. 261/124
[51] Int. Cl. .............................................. B01f 3/04
[58] Field of Search .................................. 261/124

[56] References Cited
UNITED STATES PATENTS

| | | | |
|---|---|---|---|
| 1,984,716 | 12/1934 | Welhoefer | 261/124 |
| 2,402,132 | 6/1946 | Goldberg | 261/124 |
| 3,048,339 | 8/1962 | Tapleshay | 261/124 |
| 3,214,151 | 10/1965 | Meunier | 261/124 |
| 3,255,887 | 6/1966 | Walker et al. | 261/124 |
| 3,334,819 | 8/1967 | Olavson | 261/124 |
| 3,339,901 | 9/1967 | Walker | 261/124 |
| 3,525,436 | 8/1970 | Reckers | 261/124 |
| 3,696,029 | 10/1972 | Walker | 261/124 |

Primary Examiner—Frank W. Lutter
Assistant Examiner—Steven H. Markowitz

[57] ABSTRACT

A gas diffuser including a conically-shaped diffuser cone having a plurality of openings formed along the base circumference of the cone for liberating small gas bubbles. Connected to an opening formed in the apex of the cone is a hydrostatic leg depending therefrom. The length of the hydrostatic leg is designed such that during normal operation no gas will pass therethrough. The openings in the diffuser cone include an outer entrance opening and a recessed inner entrance opening. The inner opening is of square shape to release a small bubble. The top of the diffuser cone includes a unique seat and latch connecting arrangement that enables the diffuser to be installed in an opening in gas header pipes of varying diameters.

10 Claims, 5 Drawing Figures

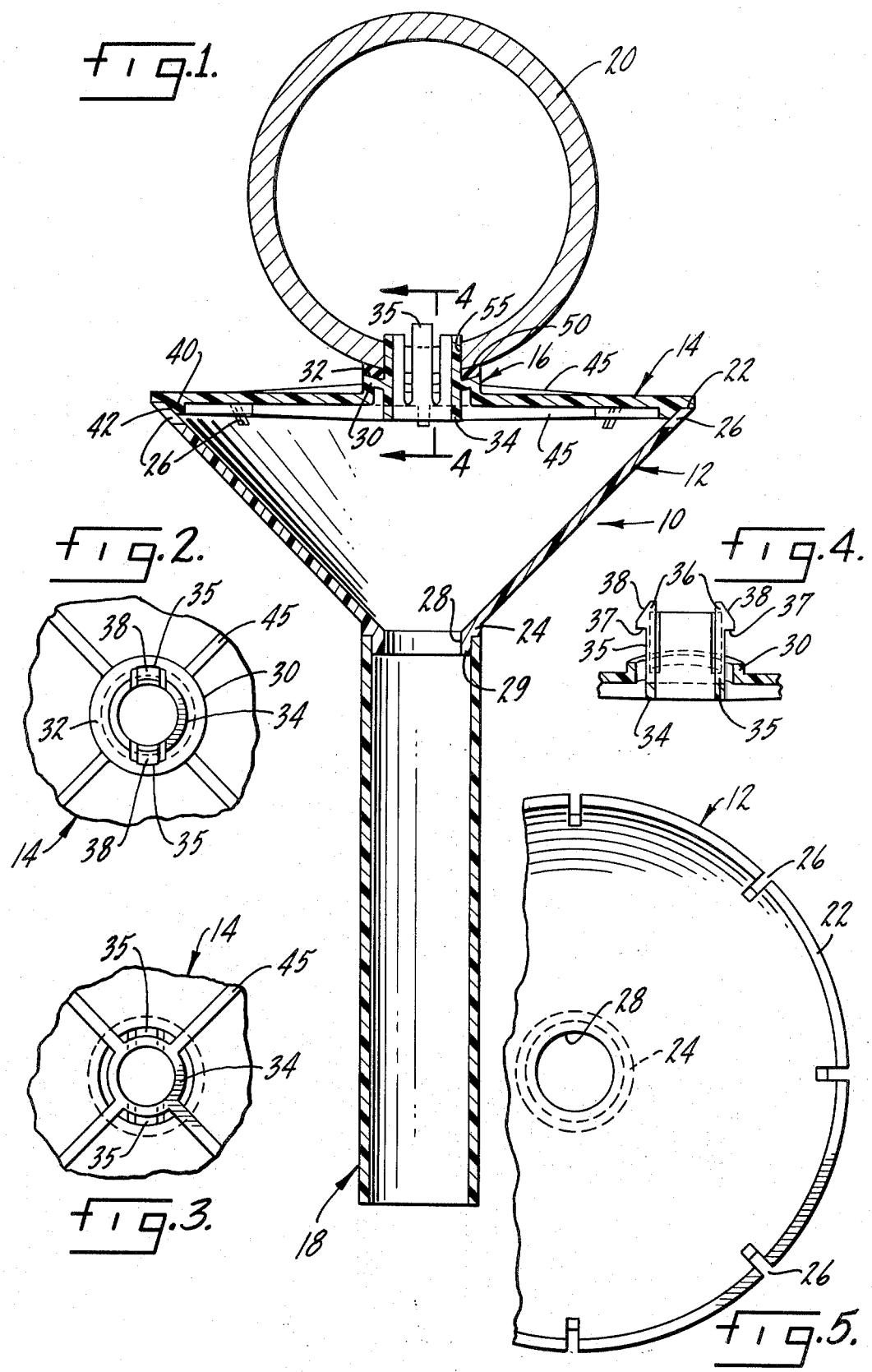

GAS DIFFUSER

BACKGROUND OF THE INVENTION

This invention relates to a gas diffuser and more particularly to a gas diffuser of the type used for the aeration of liquids in a large tank such as those used for sewage treatment.

Placing a gas in solution by diffusion is accomplished by three major mechanisms. The first portion of the absorption phase occurs at the interfaces of the bubbles during formation. The second significant absorption phase occurs as the bubbles rise to the liquid surface. The bursting of the bubbles at the surface, along with the related surface turbulence produces the third important absorption phase. The optimization of these three transfer mechanisms is required to obtain maximum gas absorption into the liquid.

The simplest approach to diffuse gas into a liquid involves passing the gas through an open end drop pipe. With this approach the bubble interface absorption phase, which is a function of bubble surface area, is in no way near optimum. Bubble rise and surface bursting are the prime absorption modes. This approach fails to take full advantage of the most significant interface phase and thus loses a great amount of potential absorption capability. Probably the most efficient solution to the diffused aeration problem incorporates the use of a porous plate to form extremely small gas bubbles. This approach optimizes the interface absorption but introduces serious clogging problems that render the diffuser useless unless cleaned frequently. This problem is particularly present when aerating domestic sewage or industrial wastes.

One of the more recent attempts to develop an improved diffuser is disclosed in U. S. Pat. No. 3,501,133. The spargers disclosed therein include a cluster of upper orifices formed therein for distributing gas to a cluster of rise points and a lower orifice spaced a distance below the upper orifices so as to liberate additional gas therethrough. The gas released through the lower orifice is in the form of large bubbles which tend to coalesce with the smaller bubbles released from the upper orifices and thereby results in reduced oxygen transfer. These spargers are further connected to the gas supply header pipe in a manner which includes connecting ears which may be a place for potential rag build-up, which could well interfere with the transfer mechanisms of the device.

The gas diffuser of the present invention provides a device which optimizes the major transfer mechanisms and solves the problems alluded to above in a unique but simple manner.

SUMMARY OF THE INVENTION

It is a primary object of the present invention to provide a gas diffuser which optimizes the major transfer mechanisms required to obtain maximum gas absorption into the liquid.

Another object of the invention is to provide a gas diffuser having a unique means for fastening it to header pipes of different diameters which eliminates catching of rags and other stringy material often found in sewage.

A further object is to provide a gas diffuser having gas diffusing openings that releases small bubbles to obtain higher oxygen transfer efficiency without substantially increasing the tendency of the openings to become clogged.

A still further object is to provide a gas diffuser that is simple in design and inexpensive to manufacture.

These and other objects of the invention are realized by the present invention by providing a gas diffuser including a conically-shaped diffuser cone having a plurality of openings formed along the base circumference of the cone for liberating small gas bubbles. Connected to an opening formed in the apex of the cone is a hydrostatic leg depending therefrom for gravity removal of any solids that may accumulate within the system during no flow conditions. The length of the hydrostatic leg is designed such that during normal operation no gas will pass therethrough. The openings in the diffuser cone include an outer entrance opening and a recessed inner entrance opening. The outer opening eliminates the larger particles that might clog up the smaller inner opening. The inner opening is of square shape because a square hole will release a smaller bubble than an equivalent circular opening because of the tendency of the bubble to tear loose from the corners of the square openings.

The top of the diffuser cone incorporates a unique seat and latch connecting arrangement that enables the diffuser to be installed in an opening in the gas header pipe in a manner which prevents the build-up of rags and other stringy materials. The latches on each side of the connecting arrangement deflect as they are pushed into the header pipe opening and snap out past the opening, thus captivating the diffuser assembly. The seat is sealed by a gasket placed between the seat and the header pipe. With the aid of the proper thickness of gasket, the diffuser can be installed on headers of various diameters.

BRIEF DESCRIPTION OF THE DRAWINGS

Other objects and features of the invention will become apparent to those skilled in the art as the disclosure is made in the following description of a preferred embodiment of the invention, as illustrated in the accompanying sheet of drawings, in which:

FIG. 1 is a vertical section of the gas diffuser of the present invention shown applied to the bottom of a gas header pipe;

FIG. 2 is a top plan view of the center portion of the diffuser cap showing the fastening means integral therewith;

FIG. 3 is a bottom plan view of the center portion of the diffuser cap in FIG. 2;

FIG. 4 is a sectional view taken along line 4—4 in FIG. 1 showing the diffuser fastening means; and FIG. 5 is a top plan view of the diffuser cone showing the openings formed therein.

DESCRIPTION OF A PREFERRED EMBODIMENT

Referring now to the drawings, and more particularly to FIG. 1, there is illustrated the gas diffuser 10 of the present invention secured to a gas header pipe 20. Gas diffuser 10 is preferably formed from three basic parts: a diffuser cone 12, a diffuser cap 14 having connecting means 16 integral therewith, and a hydrostatic leg 18 depending from diffuser cone 12. These basic parts are preferably integrally molded from plastic materials such as ABS plastic or PVC plastic to reduce the weight of diffuser 10 and increase its resistance to chemical corrosion.

Diffuser cone 12, the main body of diffuser 10, is an integrally formed inverted hollow conically-shaped member having an upper base portion 22 and a lower apex portion 24, as best seen in FIGS. 1 and 5. Formed about the outer periphery of base portion 22 are a plurality of rectangular shaped gas diffusing outlet openings 26. Openings 26 extend through the 45° inclined side surface of cone 12 with their longer sides positioned in the vertical direction. The preferred embodiment includes eight equally spaced openings 26 spaced 45° apart around the upper edge of cone 12. Openings 26 are approximately ½ inch in length and ⅛ inch in width. Apex portion 24 includes an opening 28 formed therethrough with a downwardly extending annular flange 29 formed thereabout for receipt of hydrostatic leg 18.

Hydrostatic leg 18 extends downward from apex portion 24 and is secured to flange 29 in communication with opening 28 preferably by a suitable solvent bond, as seen in FIG. 1. Leg 18 is a hollow open ended pipe of approximately 7 ½ inches in length to prevent the discharge of gas through the bottom end thereof during normal operation of diffuser 10. Hydrostatic leg 18 is effective to provide an access for gravity removal of solids that may accumulate in header pipe 20 and cone 12 during no flow conditions.

Referring to FIG. 1, a circular diffuser cap 14 closes off the open base portion 22 of cone 12. Cap 14 has a diameter substantially equal to the diameter of the outer edge of base portion 22 and is solvent bonded thereto in a suitable manner. Formed integral with the central portion of cap 14 is a connecting means 16 for seating and latching diffuser 10 to header pipe 20. Connecting means 16 includes an annular seating flange 30 having a concave seating surface 32 extending upward from cap 14 a short distance above the top surface thereof. Integral with the central opening of flange 30 is a tubular latching member 34 which extends upward above seating surface 32. Latching member 34 includes a pair of opposing deflectable latching lugs 35 formed from the sides of member 34 for locking diffuser 10 in a fixed relationship to header pipe 20. Lugs 35 include outwardly extending flanges 36 having substantially horizontal lower surfaces 37 and beveled upper surfaces 38, as best seen in FIG. 4.

Positioned inwardly from the outer peripheral edge of cap 14 and integral with the bottom surface thereof is an annular flange 40. Flange 40 includes an outer surface 42 inclined 45° and positioned to contact the inner surface of cone 12 at the base portion 22. Surface 42 extends downward approximately ⅛ inch so as to close off the upper half of gas diffusing outlet openings 26 and effectively form openings of a square shape having ⅛ inch sides. Radially extending across the upper and lower surface of cap 14 are a plurality of ribs 45 for reinforcing the structural integrity of diffuser cap 14.

Gas diffuser 10 is installed in gas header pipe 20 by positioning a sealing gasket 50 around latching member 34 and above seating surface 32, and then pushing latching member 34 and latching lugs 35 interal therewith through an opening 55 in header pipe 20 of substantially the same diameter as member 34. Surfaces 38 of lugs 35 contact the periphery of pipe opening 55 causing lugs 35 to deflect inward and permitting them to pass through opening 55 at which point lugs 35 snap out past the inner edge of opening 55 captivating the diffuser 10 with surfaces 37 of lugs 35 in contact with the inner surface of pipe 20. Sealing gasket 50 is compressed between seating surface 32 and header pipe 20. By changing the thickness of gasket 50 the gas diffuser of the present invention may be attached to header pipes of different diameters.

In the operation of diffuser 10 of the present invention, gas under pressure from header pipe 20 passes successively through opening 55, member 34 into cone 12 and exits in the form of small bubbles through outlet openings 26. The distance between openings 26 and the bottom opening in hydrostatic leg 18 is approximately 10 inches which under normal operating flow rates (i.e., 5 to 15 s.c.s.m.) are sufficient to balance the gas pressure in cone 12 and the liquid pressure within leg 18 to prevent the exiting of gas through the bottom end of leg 18. By increasing or decreasing the length of leg 18 the diffuser 10 may be adapted to handle flow rates respectively higher or lower than indicated above without exiting gas through leg 18. If the gas supply in header pipe 20 is cut off, the header will fill with liquid and any solid particles contained therein. When the gas supply is re-established, the gas will push the liquid and solid particles ahead of it along pipe 20 through opening 55 into cone 12 and out through the bottom end of hydrostatic leg 18. The gas will push down through leg 18 to a level at which the gas pressure is balanced by the liquid pressure within leg 18, at which point the diffuser 10 will attain its normal operating flow rate and discharge gas bubbles only through openings 26 in cone 12.

Diffuser 10 is specifically designed to optimize the gas absorption phase which occurs at the interfaces of the bubbles during formation at the openings 26 and during bubble rise to the liquid surface. The area of openings 26 has been optimized to create the smallest bubble possible and still prevent clogging thus introducing into the liquid the maximum ratio of surface area of the bubble to the volume of the bubble. It is significant that the openings 26 are square (approximately ⅛ inch on each side) in lieu of the traditional round openings. A square opening will release a smaller bubble than an equivalent circular opening because of the tendency of the bubble to tear loose from the corners of a square opening. As soon as the bubble breaks from one corner, it will be released. This early release is caused by the unusual forces caused by forming a round bubble from a square opening. With a circular opening, the early release is not realized since the shape of the bubble is round and conforms to the opening without any unusual forces. To obtain release of bubbles of equal size, the circular opening must be smaller. With a smaller size opening comes the increased danger of clogging.

The conical shape of diffuser cone 12 is effective to increase the velocity of the liquid as it rises past the diffuser. As the area of the water column is decreased by increasing the area occupied by diffuser cone 12, the velocity of the water in the near proximity of cone 12 will also increase. The maximum velocity will thus be reached at the top of base 26 of cone 12. This increased velocity increases the transfer efficiency of diffuser 10 in two ways. First, the increased velocity causes a turbulence area immediately above cone 12. The conical shape of diffuser cone 12 in conjunction with the flat cap 14 also increases the turbulence above cone 12 because of the hydraulic patterns produced from this unique combination. This turbulence area breaks the already small bubbles into even smaller bubbles by the hydraulic shear created by the turbulence. Of course, smaller bubbles obtain higher efficiency because of the higher surface area to volume ratio of the smaller bubbles compared to the bubbles before the area of high turbulence. Secondly, the increased force of the liquid passing by diffuser outlet openings 26 breaks the bubbles loose from the openings when they are smaller with a similar increase in transfer efficiency. Further, by releasing the bubbles at the top edge of cone 12 in an area of high turbulence and high velocity the amount of bubble coalesence is minimized.

The specific manner in which the square openings are formed by rectangular openings 26 in cone 12 in combination with annular flange 40 on diffuser cap 14 helps decrease the clogging of the openings. The outer rectangular opening eliminates the larger particles which might clog up the smaller inner opening. Elimination of the larger particles is also accomplished by the fact that the inner opening from which the bubble emits is recessed away from the outer surface. The conical shape of diffuser cone 12 and the specific design of connecting means 16 do not provide obstructions which could possibly catch rags and other stringy material often found in sewage which could interfere with the transfer mechanism of the diffuser.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A gas diffuser for liberation of gas below the surface of a liquid comprising a hollow conically-shaped body member having an upper base portion and a lower apex portion, said base portion having a cap closing off said base portion and said apex portion having an opening formed therethrough, a hydrostatic leg extending downward from said apex opening having an upper open end in communication with said apex opening and a lower open end spaced therebelow, said base portion having a plurality of gas diffusing outlet openings formed therein about the outer periphery thereof, said cap having an inlet opening centrally formed therein to receive a supply of gas from a gas supply header and said lower open end of said hydrostatic leg being spaced a sufficient distance below said gas diffusing outlet openings to prevent gas from exiting therethrough.

2. A gas diffuser of the type secured to a gas header pipe for the liberation of gas near the bottom of a sewage treatment tank, comprising: a hollow conically-shaped body member having an upper base portion and a lower apex portion, said base portion having a cap closing off the upper end thereof, said cap having an inlet opening centrally formed therein in fluid communication with the underside of said header pipe, said apex portion having an opening formed therethrough; a hydrostatic leg extending downward from said apex opening having an upper open end in communication with said apex opening and a lower open end spaced therebelow; and a plurality of gas diffusing outlet openings formed about the outer periphery of said base portion said lower open end of said hydrostatic leg being spaced a sufficient distance below said gas diffusing outlet openings to prevent gas from exiting therethrough during normal operation of the gas diffuser.

3. The invention as defined in claim 2 wherein said gas diffusing outlet openings are of a substantially square shape.

4. The invention as defined in claim 2 wherein said gas diffusing outlet openings are of a substantially rectangular shape and said cap includes a downwardly projecting annular flange which is positioned to block off the upper portions of said gas diffusing outlet openings at the inner surface thereof so as to define gas diffusing outlet openings that are effectively of a substantially square shape.

5. The invention as defined in claim 2 wherein said cap includes connecting means associated therewith for connecting said gas diffuser to said header pipe.

6. The invention as defined in claim 5 wherein said connecting means includes a tubular latching member having a first open end secured to said cap in fluid communication with the interior thereof and a second open end in fluid communication with the interior of said header pipe, said second open end having latch means associated therewith for securely connecting said top portion to said header pipe.

7. The invention as defined in claim 6 wherein said cap includes annular seat means positioned about said latching member and sealing means being provided between said seat means and said header pipe.

8. The invention as defined in claim 7 wherein said latch means includes a plurality of semi-rigid connecting lugs formed from said tubular connecting members, said lugs having outwardly extending flanges formed integral with the upper ends thereof for contacting the inner surface of said header pipe and thereby securing said gas diffuser in place.

9. A gas diffuser of the type secured to a gas header pipe for the liberation of gas near the bottom of a sewage treatment tank, comprising: a hollow conically-shaped body member having an upper base portion and a lower apex portion, said base portion having a cap closing off the upper end thereof, said cap having an inlet opening centrally formed therein in fluid communication with the underside of said header pipe, said apex portion having an opening formed therethrough; a hydrostatic leg extending downward from said apex opening having an upper open end in communication with said apex opening and a lower open end spaced therebelow; a plurality of rectangular gas diffusing outlet openings formed about the outer periphery of said base portion, said cap having an annular flange associated with the underside thereof positioned to close off a portion of said outlet openings so as to effectively form outlet openings of a substantially square shape, said lower open end of said hydrostatic leg being spaced a sufficient distance below said gas diffusing outlet openings to prevent gas from exiting therethrough during normal operation of the gas diffuser; connecting means associated with said cap for connecting said gas diffuser to said header pipe, said connecting means including a tubular latching member having a first open end secured to said cap in fluid communication with the interior thereof and a second open end in fluid communication with the interior of said header pipe, said second open end having latch means associated therewith for securely connecting said top portion to said header pipe; and annular seating means positioned about said latching member for compressing sealing gasket between said seating means and said header pipe.

10. The invention as defined in claim 9 wherein said latch means includes a plurality of semi-rigid connecting lugs formed from said tubular connecting member, said lugs having outwardly extending flanges formed integral with the upper ends thereof for contacting the inner surface of said header pipe and thereby securing said gas diffuser in place with said sealing gasket compressed between said seating means and said header pipe.

* * * * *

PO-1050
(5/69)

UNITED STATES PATENT OFFICE
CERTIFICATE OF CORRECTION

Patent No. 3,790,142　　　　　　　　　Dated　February 5, 1974

Inventor(s) Brian L. Goodman, Robert B. Higgins and Frank M. Denham

It is certified that error appears in the above-identified patent and that said Letters Patent are hereby corrected as shown below:

In column 3, line 12, delete "1/2" and insert --1/4--.

In column 3, line 21, delete "7-1/2" and insert --7-1/4--.

In column 3, line 60, delete "interal" and insert --integral--.

Signed and sealed this 7th day of May 1974.

(SEAL)
Attest:

EDWARD M.FLETCHER,JR.　　　　　　　　C. MARSHALL DANN
Attesting Officer　　　　　　　　　　　Commissioner of Patents